United States Patent [19]

Pryor

[11] Patent Number: 5,398,721
[45] Date of Patent: Mar. 21, 1995

[54] COMPRESSED GAS INTEGRAL REGULATOR AND FLOWMETER

[75] Inventor: David A. Pryor, Florence, S.C.

[73] Assignee: The ESAB Group, Inc., Florence,

[21] Appl. No.: 257,378

[22] Filed: Jun. 9, 1994

[51] Int. Cl.⁶ .......................................... F16K 31/122
[52] U.S. Cl. .................. 137/613; 137/505.25; 137/557; 137/559; 73/861.55; 73/199
[58] Field of Search ............. 137/505, 505.12, 505.13, 137/505.25, 557, 559, 613; 73/861.55, 199

[56] References Cited

U.S. PATENT DOCUMENTS

| | | |
|---|---|---|
| 1,741,489 | 12/1929 | Watts . |
| 1,856,505 | 5/1932 | Persson . |
| 2,445,544 | 7/1948 | Trautman . |
| 2,623,331 | 12/1952 | Greening . |
| 2,637,339 | 5/1953 | Pease . |
| 2,655,041 | 10/1953 | Jacobsson ............................. 73/199 |
| 2,908,158 | 10/1959 | Jacobsson ................... 137/505.12 X |
| 3,004,686 | 10/1961 | McKee . |
| 3,269,411 | 8/1966 | Teston . |
| 3,559,677 | 2/1971 | Barasko . |
| 3,995,656 | 12/1976 | Mills, Jr. . |
| 4,181,139 | 1/1980 | Martini ....................... 137/505.25 X |
| 4,226,257 | 10/1980 | Trinkwalder . |
| 4,317,375 | 3/1982 | Egert ............................... 73/861.55 |
| 4,655,246 | 4/1987 | Phlipot et al. . |
| 4,898,205 | 2/1990 | Ross ............................... 137/505.12 |
| 4,905,723 | 3/1990 | Pritchard et al. . |
| 4,909,269 | 3/1990 | Pritchard et al. . |
| 4,924,904 | 5/1990 | Carter . |
| 4,966,307 | 10/1990 | Cornil ............................... 73/199 X |

Primary Examiner—Martin P. Schwadron
Assistant Examiner—Kevin L. Lee
Attorney, Agent, or Firm—Bell, Seltzer, Park & Gibson

[57] ABSTRACT

An integral gas regulator and flowmeter unit. The unit has a housing body with a high pressure gas inlet, a low pressure gas outlet, and a receptacle. A passage communicates gas to a valve seat in the receptacle. A differential pressure piston having seals at each end is slidably received within the receptacle and is spring biased away from the valve seat. A first end of the piston cooperates with the valve seat for controlling gas flow into the receptacle. A bore within the piston communicates gas from the first end to a second end of the piston. A floating inner flow tube mounted on the second end of the piston receives gas from the bore. A ball is slidably received within the inner flow tube. An outer flow tube overlies the inner flow tube. Both tubes are arranged for being positioned in a normally vertical position and may be marked with graduations for indicating the ball position. Thus, the pressure of a gas is reduced from a high pressure to a desired lower pressure, and the flow rate of the gas is indicated. A low pressure gas passage communicates low pressure gas from the flowmeter to the outlet. A flow adjusting valve may be provided. A pressure gauge may also be included to indicate the pressure of the gas entering the unit.

13 Claims, 3 Drawing Sheets

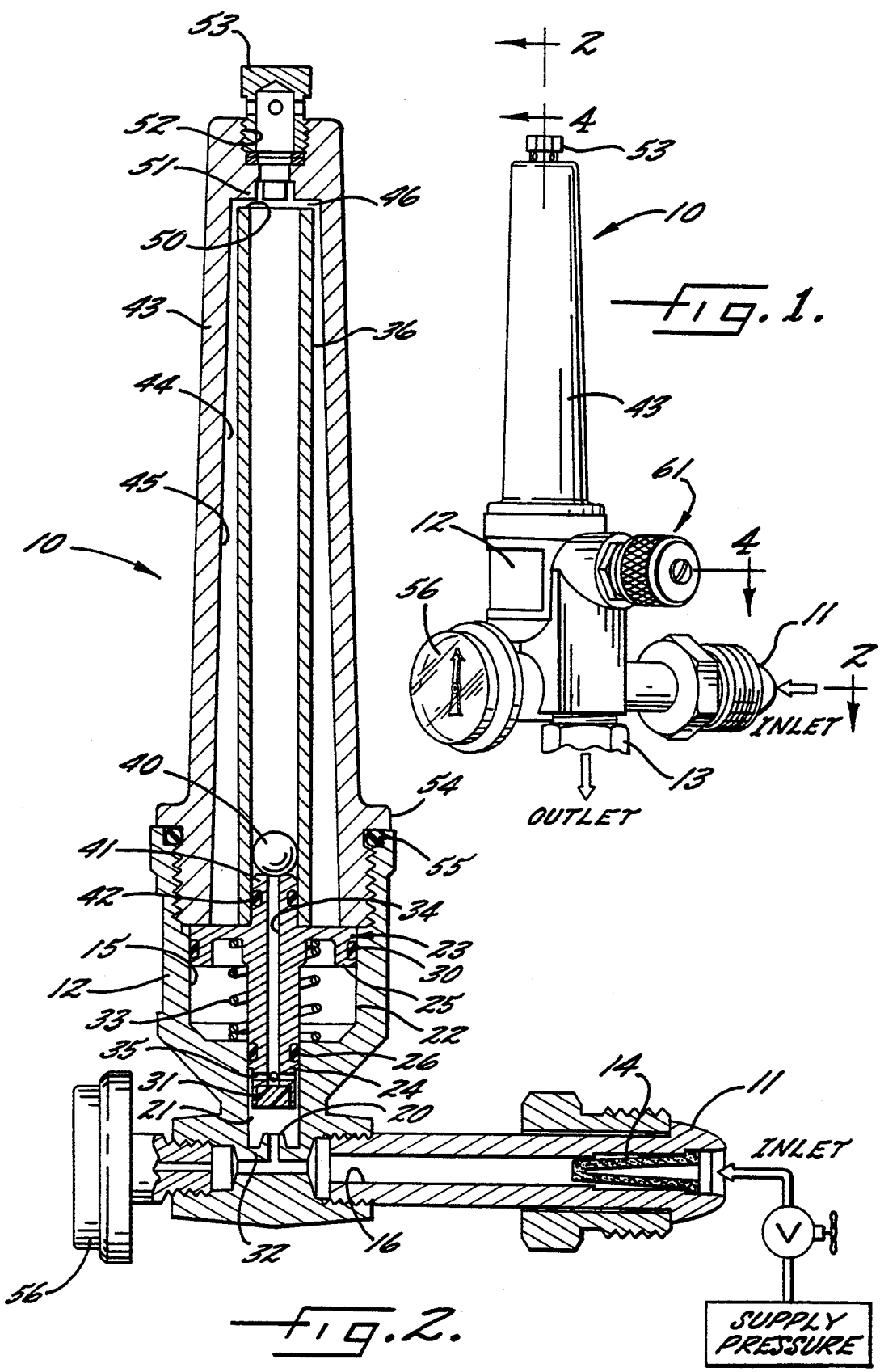

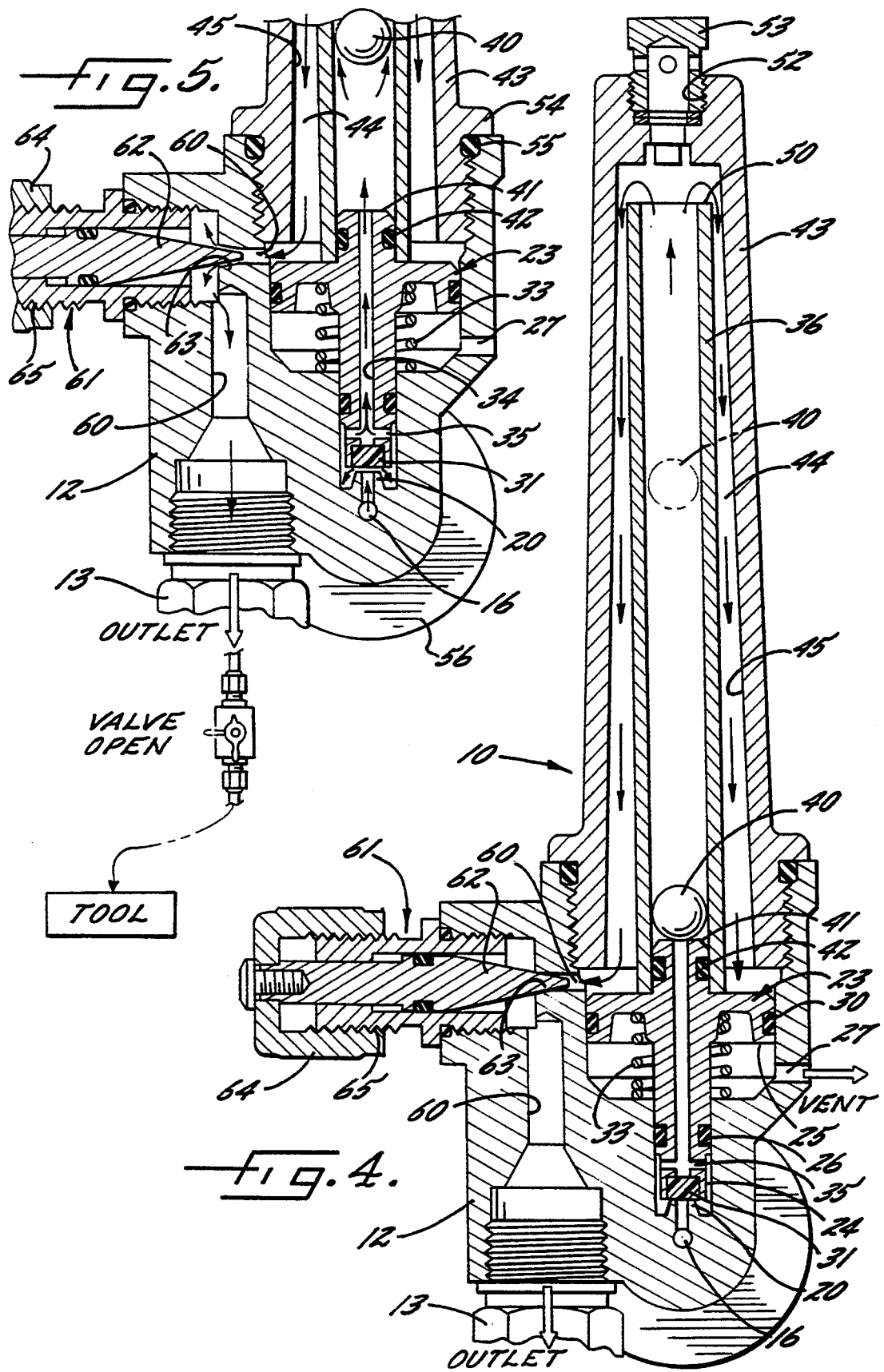

COMPRESSED GAS INTEGRAL REGULATOR AND FLOWMETER

FIELD OF THE INVENTION

The invention relates to apparatus for reducing the pressure of a gas from a high pressure to a desired lower pressure, regulating the gas pressure and flow, and indicating the gas flow rate. In particular, the invention relates to an integral compressed gas regulator and flowmeter.

Background of the Invention

Compressed gases such as oxygen, $CO_2$ or other gases are commonly provided in compressed form within cylinders or other portable containers. The gas within a cylinder is usually maintained at high pressure, often 3000 PSI or higher, so as to minimize bulk and to maximize the quantity of gas that may be contained within the cylinder. Thus, a substantial quantity of gas may be transported from place to place within the cylinder for use in a variety of applications. In addition to containment within portable cylinders, high pressure gases may also be fed from point to point in fixed high pressure gas lines.

Frequently, particular applications require a supply of gas at a pressure far lower than the pressure of the gas within the portable cylinder or which may be introduced from a high pressure feed line. Accordingly, the pressure of the gas must be reduced from the high pressure, which may often be at about 3000 PSI or so, to a much lower pressure, such as, for example, between about 25–50 PSI for certain applications. Higher and lower pressures are sometimes needed. Often, the gas flow rate that is required may vary, while it is meanwhile necessary that the lower pressure remain substantially constant.

One example in which such conditions are encountered is in the welding industry. Welding equipment such as Mig or Tig welding machines generally require a supply of a shielding gas such as carbon dioxide ($CO_2$), argon (Ar), or mixtures of such gases, each of which must be provided to the welding tools at a relatively low pressure. A range of between about 25 PSI and 50 PSI is common. Similar relatively low pressure requirements are also encountered in other industrial applications; in the medical field; and in scientific laboratories.

To satisfy these needs, gas regulators and flowmeters have in the past been provided so as to provide a supply of constant low pressure gas over varying flow rates. Some prior gas regulators are provided separate of gas flowmeters; alternatively, some prior gas regulators and flowmeters have been of integrated construction. Obviously, use of integrated equipment provides an inherent advantage in that bulk and the number of pieces of equipment at a jobsite are minimized. However, the mechanical construction of prior integrated regulator/flowmeter apparatus has heretofore been complex, and consequently, relatively expensive to manufacture.

One such integral compressed gas regulator/flowmeter apparatus that is conventional in the prior art has a housing body to which a gas regulator and a separate variable orifice gas flowmeter are mounted. A gas inlet is provided in the housing body, through which high pressure gas may enter the housing body; the gas is then communicated through a series of cross-drilled holes that extend within the housing body. The holes first direct the gas to a regulator assembly, so that the high pressure gas impinges on a reciprocating piston regulator having a small first end that seats on the housing body, and an enlarged flange end that is covered by a separate housing cap.

The reciprocating piston is normally biased away from a seating location by a pressure delivery spring. Gas flows past the seating location, into several cross-drilled holes that pass radially through the piston shaft between the seating location and a first sliding seal, and into a central bore along the longitudinal axis of the piston. The bore communicates the gas to an enlarged flange portion of the piston that underlies the housing cap, so that the gas is released into a plenum behind the piston and underlying the housing cap; this plenum is sealed by a second sliding seal between the sides of the housing cap and enlarged piston flange. The portion of the piston between the first and second sliding seals is typically exposed to atmospheric pressure. By this known construction, the force of the pressurized gas on the large surface area of the enlarged flange of the piston opposes the bias induced by the pressure delivery spring so as to regulate the size of the opening between the small seating end of the piston and the valve seating location. Thus, a regulated and relatively constant lower pressure may pass back into the housing body.

The gas then passes through still more cross-drilled holes to a rupture disc safety device, which may be provided within the housing body in case of a malfunction in the regulator. Further cross-drilled holes in the housing body communicate low pressure gas from the rupture disc to a variable orifice flowmeter, which is commonly positioned at the side of the housing body opposite the regulator. The gas enters the flowmeter through a central vertical and transparent inner flow tube. A ball is located within the inner flow tube which has a diameter that is nominally smaller than the inside diameter of the inner flow tube. The gas flowing through the inner tube pushes the ball to a height that is dependent on the flow rate of the gas. The gas flows past the ball and over and around an unconnected end of the inner flow tube. A transparent, frustroconical outer flow tube is also provided, so as to contain the gas after it passes over the end of the inner tube, and to direct the gas back down along the outside surface of the inner flow tube and into the housing body. The inner flow tube and outer flow tube include graduated markings that correspond to the position of the ball so as to provide an indicium of the gas flow rate.

Still further holes extend through the housing body at the base of the frustroconical outer flow tube for communicating the low pressure gas, typically, to a metering valve. The metering valve is often adjustable so that the gas flow rate may be set at a desired level. An outlet connection extends from the metering valve, or from the housing body itself, for receiving a hose, pipe or tube to receive the low pressure, regulated gas flow.

The conventional integral regulator/flowmeter apparatus described above is disadvantageous in many ways. First, a separate housing cap is required to enclose the reciprocating piston and pressure delivery spring adjacent the housing body. The housing cap must necessarily be machined under close tolerances for proper operation of the regulator, particularly so that the sliding seal of the piston will seal properly. Moreover, multiple cross-drilled holes are required within the housing body for communicating the gas from the inlet, to the piston regulator, from the regulator to the rupture disc, on to the flowmeter, and finally, from the flowmeter to the metering valve and/or an outlet connection. Accordingly, the housing body is quite complex, requires close tolerances, and is therefore relatively expensive to fabricate. Further, the relatively high level of complexity of the conventional integral regulator/flowmeter apparatus increases the possibility of failure, and the consequent expense of repair in the event of a failure. Likewise, because the inner flow tube of the flowmeter is fixably mounted against the housing body, close tolerances must be maintained between the housing body, the inner flow tube and the outer flow tube.

In light of the aforementioned deficiencies, it is an object of the present invention to provide a new integral gas regulator/flowmeter apparatus in which the complexity of the housing body and number of cross-drilled holes therein are minimized.

Another object of the present invention is to provide an integral regulator/flowmeter apparatus in which the need for a separate regulator housing cap is eliminated.

A further object of the present invention is to provide an integral compressed gas regulator/flowmeter in which the need for close tolerances between the inner flow tube, housing body and outer flow tube is minimized.

SUMMARY OF THE INVENTION

The above and other objects and advantages of the present invention are achieved in the embodiment described herein by the provision of a new integral gas regulator and flowmeter. The apparatus has a housing body with a high pressure gas inlet, a low pressure gas outlet, and a receptacle. The receptacle preferably has a first portion having a first cross sectional area, and a second portion having a relatively larger second cross sectional area. A valve seat is also located within the receptacle, and a high pressure gas passage is provided in the housing body for communicating high pressure gas from the gas inlet to an opening in the receptacle at the valve seat.

A differential pressure piston is slidably received within the receptacle. The piston has a first end having a cross sectional area corresponding to the first portion of the receptacle and for cooperating with the valve seat for controlling gas flow into said receptacle, and a second end having a surface area relatively larger than the first end and which corresponds to the second portion of the receptacle. A first gas seal is mounted on the piston adjacent the first end of the piston, and a second gas seal is mounted on the piston adjacent the second end. Each seal is slidable against the receptacle. A bore extends within the piston for communicating gas from the first end to the second end. A pressure delivery spring extends between the housing body and the piston so as to bias the first end of the piston away from the valve seat.

A floating inner flow tube is mounted on the second end of the piston for receiving gas from the piston bore. A ball or other gas obstruction is slidably received within the inner flow tube and has a size for permitting gas to flow through the inner flow tube around and past the ball. An outer flow tube is mounted on the housing body so as to overlie the inner flow tube and to define a gas plenum around the inner flow tube. The inner flow tube may be substantially cylindrical, and the outer flow tube may be substantially frustroconical, and both tubes are preferably arranged so as to be positioned in a normally vertical position when in use. Thus, gas may flow from the piston bore, through the inner flow tube, around and past the gas obstruction such as a ball, and further into the gas plenum between the inner and outer flow tubes. The inner and/or outer flow tubes may include graduations for indicating the position of the obstruction such as a ball within the inner tube and which are calibrated so as to reflect the flow rate of low pressure gas. This combination reduces the pressure of a gas from a high pressure to a desired substantially lower pressure, and further, provides an indication of the rate of flow of the gas by the position of the ball or other obstruction within the inner flow tube.

A low pressure gas passage also extends through the housing body for communicating low pressure gas from the gas plenum between the inner and outer flow tubes to the low pressure gas outlet. A flow rate adjusting valve may be provided in communication with the low pressure gas passage for manually adjusting the rate of flow of the low pressure gas exiting from the low pressure gas outlet. The adjustable valve may be a screw-type needle valve. Also, a pressure gauge may be included in communication with the high pressure gas passage in the housing body for indicating the pressure of gas entering the high pressure gas inlet.

BRIEF DESCRIPTION OF THE DRAWINGS

The foregoing and other objects, advantages and features of the invention, and the manner in which the same are accomplished, will become apparent from the following detailed description of the invention taken in conjunction with the accompanying drawings which illustrate a preferred and exemplary embodiment, wherein:

FIG. 1 is a perspective view showing one embodiment of an integral compressed gas regulator and flowmeter in accordance with the present invention;

FIG. 2 is a partially schematic, sectional view taken along line 2—2 of FIG. 1;

FIG. 4 is a sectional view taken along line 4—4 of FIG. 1 and which further illustrates the gas flow through the present invention; and FIG. 5 is a partially schematic sectional view taken along line 4—4 of FIG. 1 which shows the biasing of the regulator piston and communication of the low pressure regulated gas supply to a workpiece.

DESCRIPTION OF THE PREFERRED EMBODIMENT

Figure 3:
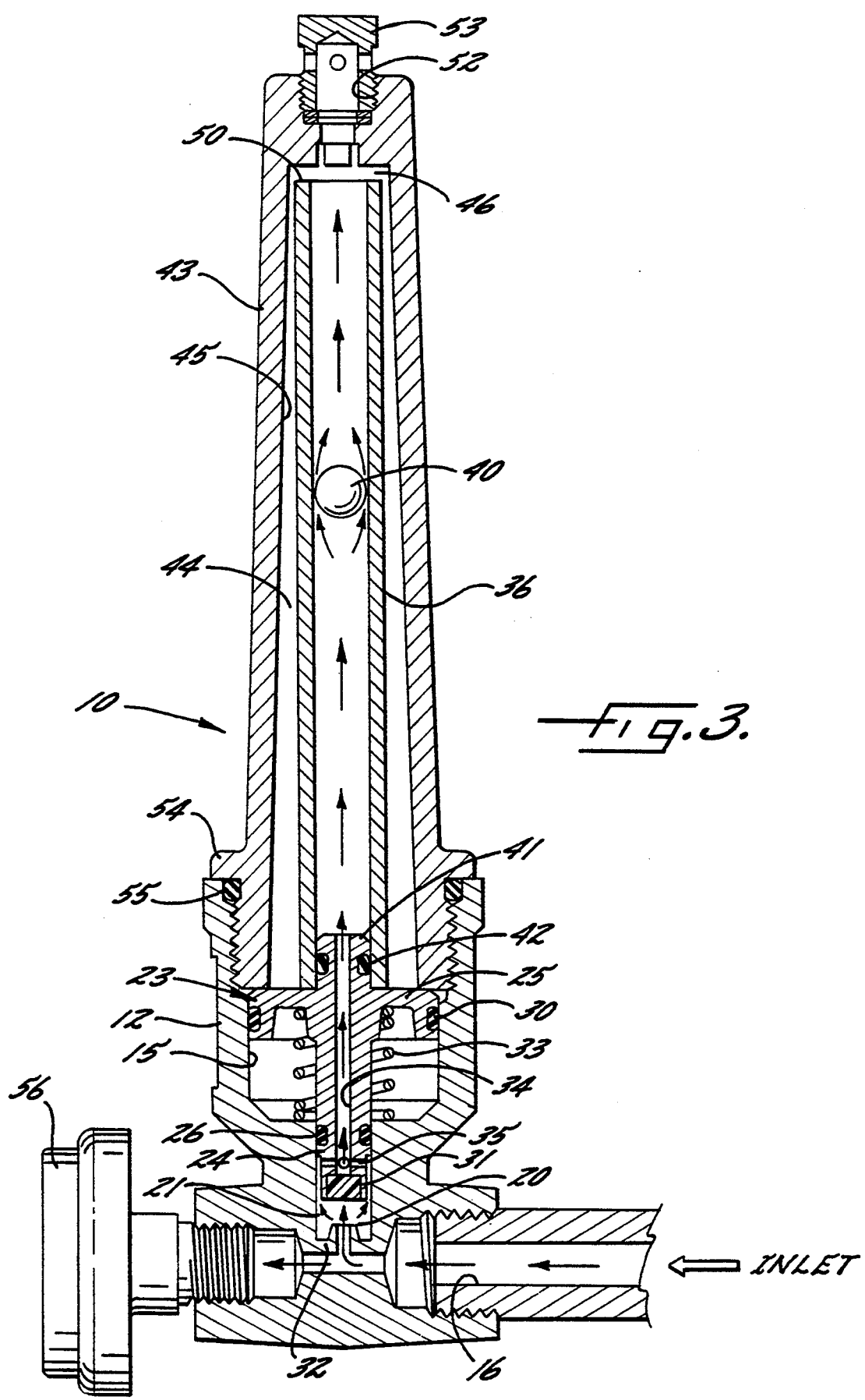
FIG. 3 is a partial sectional view taken along line 2—2 of FIG. 1, in which the gas flow through the invention is shown.

Referring now to the drawings, FIG. 1 is a perspective view of one embodiment of the new compressed gas integral regulator and flowmeter, indicated generally at 10. The integral unit 10 includes a high-pressure gas inlet 11, which may be connected via tubing or directly to an outlet from a source of compressed gas, such as a cylinder of compressed argon or carbon dioxide. The high-pressure gas inlet 11 is included in a housing body 12, to which the regulator and flowmeter are mounted, and a low-pressure gas outlet 13.

Referring now to FIG. 2, the integral regulator and flowmeter unit 10 is shown in partial cross sectional view, and schematically, so that the high-pressure gas inlet 11 is shown in communication with a high pressure gas supply. The introduction of the high pressure gas to the inlet 11 is controlled by a cutoff valve V. An internal strainer 14 may be received within the high pressure gas inlet 11 for filtering the gas introduced to the integral unit 10.

Still referring to FIG. 2, the housing body 12 includes a receptacle 15. A high pressure gas passage 16 is provided within the housing body for communicating high pressure gas from the inlet 11 to the receptacle 15. The high pressure gas passage 16 may open into the receptacle 15 at a central portion of a valve seat 20.

In a preferred embodiment, the receptacle 15 includes a first portion 21, which has a first cross sectional area, and a second portion 22 having a second cross sectional area. This second portion 22 may have a relatively larger cross sectional area than the cross sectional area of the first portion 21. Preferably, the valve seat 20 is located at the base 32 of the first portion 21 of the receptacle 15.

Still referring to FIG. 2, a differential pressure piston 23 is slidably received within the receptacle 15. The piston may have a first end 24 which has a cross sectional area corresponding to the cross sectional area of the first portion 21 of the receptacle 15. Further, the piston may include a second end 25 which has a cross sectional area corresponding to the area of the second portion 22 of the receptacle 15.

A first gas seal 26 is mounted on the piston 23 adjacent the first end 24, and a second gas seal 30 is mounted on the piston 23 adjacent the second end 25. Each seal 26, 30 is slidable against the receptacle 15. Further, the first end 24 of the piston 23 includes a valve seating location 31, which may be made of teflon or the like, for cooperating with the valve seat 20 at the base 32 of the receptacle 15 for controlling the flow of gas into the receptacle 15.

A pressure delivery spring 33 extends between the housing body 12 and the piston 23. The spring 33 biases the piston 23 away from the base 32 of the receptacle 15, and consequently, biases the first end 24 of the piston 23 away from the valve seat 20. As shown in FIG. 4, a piston vent 27 may be provided within the housing body 12 for communicating air at environmental pressures to the space of the receptacle 15 between the first and second gas seals 26 and 30.

Referring again to FIG. 2, a bore 34 extends within the piston 23 for communicating gas from the first end 24 of the piston 23 to the second end 25. The bore 34 may include one or more cross drilled holes 35 that extend radially near the first end 24 of the piston 23, so as to receive gas passing between the valve seat 20 and seating location 31 in the receptacle 15. Thus, gas may be received from the high pressure gas inlet 11, through the high pressure passage 16, through the opening in the valve seat 20, and is thereupon conveyed into the bore 34 so as to exit the second end 25 of the piston 23.

A floating inner flow tube 36 may be mounted on the second end 25 of the piston 23 for receiving gas from the bore 34. The floating inner flow tube 36 may be substantially cylindrical in shape so as to contain a gas obstruction such as a ball 40. The ball 40 or other gas obstruction is slidably received within the inner flow tube 36 and has a size (diameter or other external dimension) so as to permit gas to flow through the length of the inner flow tube 36 and around and past the ball 40 or other obstruction. The inner flow tube 36 may be sealed to the second end 25 of the piston 23 via a raised portion 41 of the piston 23 and an inner flow tube seal 42. Consequently, the inner flow tube 36 moves in conjunction with movement of the piston 23 when the piston slides within the receptacle 15.

An outer flow tube 43 may be mounted on the housing body 12 so as to overlie the inner flow tube 36 and to define a gas plenum 44 between the periphery of the floating inner tube 36 and the interior surface 45 of the outer flow tube 43. While the inner flow tube 36 may be substantially cylindrical, the outer flow tube 43 is preferably substantially frustroconical. A gap 46 is provided between a free end 50 of the inner flow tube 36 and the closed end 51 of the outer flow tube 43. A vent or other sealable opening 52 may be provided at the closed end 51 of the outer flow tube 43. The vent may be sealed by a plug, or a rupture disk 53, or a reseating relief valve or other safety apparatus for relieving pressure in the event of a malfunction of the piston 23 or related components. Alternatively, a rupture disk or other safety device may be provided in the housing body 12.

The outer flow tube 43 is received by a portion of the receptacle 15 of the housing body 12. In the embodiment shown in FIG. 2, the outer flow tube 43 is received in a threaded portion of the receptacle 15. A flange 54 may be provided in the outer flow tube 43, and an outer flow tube seal ring 55 also provided, for defining a gas seal between the housing body 12 and the outer flow tube 43. In a preferred embodiment, the interior surface 45 of the outer flow tube 43 may define an opening slightly smaller than the cross sectional area of the second end 25 of the piston 23 so as to limit the range of movement of the piston 23.

In a preferred embodiment, the variable orifice flowmeter defined by the ball or other obstruction 40, the inner flow tube 36 and the outer flow tube 43 includes graduations for indicating the position of the ball or other obstruction 40 within the inner flow tube 36. Preferably, the inner flow tube 36 and outer flow tube 43, or portions thereof, are transparent or translucent. The graduations may ideally appear on the inner flow tube 36. The graduations are calibrated so as to reflect the flow rate of the low pressure gas exiting the second end 25 of the piston 23, and consequently, from the low pressure gas outlet 13.

The integral unit 10 is designed so that the flow tubes 36 and 43, and the piston 23, are oriented in a generally vertical position when in use. Thus, the position of the ball or other obstruction 40 may reliably be indicated by the graduations marked on the flow tubes 43 or 36.

The sliding movement of the piston 23 is typically relatively small. Since movement of the piston may typically reach no more than about 0.005 inch, the much larger gap 46 between the free end 50 of the inner flow tube 36 and the closed end 51 of the outer flow tube 43 is not meaningfully affected by movement of the piston 23 and floating inner flow tube 36.

Referring now to FIG. 3, high pressure gas is shown entering the housing body 12 through the high pressure gas passage 16, and further, into the opening of the valve seat 20 at the base 32 of the receptacle 15. The high pressure gas may also be communicated to a pressure gauge 56 that is in communication with the high pressure gas passage 16 in the housing body 12 for indicating the pressure of the gas entering the high pressure gas inlet 11. Upon passing from the high pressure gas passage 16 into the valve seat 20, the gas enters the first portion 21 of the receptacle 15 when the valve seat 20 and seating location 31 are open. Gas is further communicated into the cross drilled holes 35 of the piston 23 and into the bore 34. The gas is conveyed through the bore 34 to the second end 25 of the piston 23. After exiting the piston 23, the gas passes through the interior of the floating inner flow tube 36, which, for use, is arranged in a generally vertical orientation. The gas further passes around the ball or other obstruction 40 within the floating inner tube 36, out the free end 50 of the inner flow tube 36, and into the gas plenum 44 defined between the outer periphery of the inner flow tube 36 and the interior surface 45 of the outer flow tube 43. Thus, counteracting pressures on the relatively greater surface area at the second end 25 of the piston 23 against the pressure at the relatively smaller first end 24 of the piston 23 causes the piston 23 to slide within the receptacle 15 for regulating the pressure of the gas from a high input pressure to a relatively lower desired output pressure. In some applications, an output pressure of between about 20 and 50 psi may frequently be desired. The output pressure is generally determined by the relative surface areas of the first and second ends 24, 25 of the piston 23 and the force exerted by the pressure delivery spring 33.

Continuing with FIG. 4, the integral unit 10 is shown with the valve seat 20 and seating location 31 of the piston 23 closed. The ball 40 is shown resting on the second end 25 of the piston 23, thus indicating no gas flow through the tube 36. The ball 49 is also shown in phantom in a second position, which would indicate a gas flow through the tube 36. Low pressure gas passing through the inner flow tube 36 is shown entering the gas plenum 44 between the tube 36 and outer flow tube 43 and into a low pressure gas passage 60 within the housing body 12. The low pressure gas passage 60 communicates the low pressure gas from the plenum 44 to the low pressure gas outlet 13. A flow rate adjusting valve 61 may be provided between the plenum 44 and the low pressure gas outlet 13, in communication with the low pressure gas passage 60, for manually adjusting the flow rate of the exiting low pressure gas to a desired level. The flow rate adjusting valve 61 may be a needle valve having a movable needle 62 in cooperation with a fixed seat 63 defined by the housing body 12. The needle 62 may be moved by turning a knob 64 which acts with threads 65 to move the needle 62 into or out of engagement with the fixed seat 63. The adjusting valve 61 is shown in a closed position in FIG. 4 and in an open position in FIG. 5.

Again referring to FIG. 5, the gas flow through the variable orifice flowmeter into the flow rate adjusting valve 61 and on to the low pressure gas outlet 13 is shown. Here, the valve seat 20 and the seating location 31 are shown in an open position so as to permit gas to flow through the bore 34. Gas exits the plenum 44 into the low pressure gas passage 60, between the needle 62 and fixed seat 63, and further through the low pressure gas passage 60 to the outlet 13. The outlet 13 may be threaded for being connected to a tube, hose or other conveyance means so as to communicate the low pressure gas to a tool or other desired location, as shown schematically in FIG. 5. Also as shown schematically in FIG. 5, a low pressure gas cut off valve may be provided between the outlet 13 and the tool or other desired location.

Assemblage of the piston 23 and inner flow tube 36 in a floating configuration within a single receptacle 15, and a concentric mounting of the outer flow tube 43 above the receptacle 15, greatly minimizes the expense and number of bores and parts that had previously been required in known integral gas regulators and flowmeters. For example, a separate housing cap above the gas regulating piston is not required. The present invention reduces the pressure of the gas from a high pressure to a desired substantially lower pressure, and further, provides an indication of the rate of flow of the gas via the position of the ball or other obstruction 40 within the inner flow tube 36.

In the drawings and specification, there has been disclosed a typical preferred embodiment of the invention. Although specific terms have been employed, they have been used in a generic and descriptive sense only and not for purposes of limitation, the scope of the invention being set forth in the following claims.

That which is claimed is:

1. An integral gas regulator and flowmeter, comprising:
   a housing body having a high pressure gas inlet, a low pressure gas outlet, and a receptacle;
   a valve seat within said receptacle;
   a high pressure gas passage in said housing body for communicating high pressure gas from said gas inlet to said valve seat and opening into said receptacle;
   a differential pressure piston slidably received within said receptacle and having a first end for cooperating with said valve seat for controlling gas flow into said receptacle, and a second end having a surface area relatively larger than said first end;
   a first gas seal on said piston adjacent said first end and a second gas seal on said piston adjacent said second end, each said seal being slidable against said receptacle;
   a bore within said piston for communicating gas from said first end to said second end;
   a pressure delivery spring extending between said housing body and said piston so as to bias said first end of said piston away from said valve seat;
   a floating inner flow tube mounted on a portion of said second end of said piston for receiving gas from said piston bore;
   a gas obstruction within said inner flow tube having a size so as to permit gas to flow through said inner flow tube, around and past said obstruction;
   an outer flow tube mounted on said housing body so as to overlie said inner flow tube and to define a gas plenum around said inner flow tube, such that gas may flow out of said inner flow tube and into said gas plenum; and
   a low pressure gas passage in said housing body for communicating low pressure gas from said gas plenum to said low pressure gas outlet, whereby the pressure of a gas is reduced from a high pressure to a desired substantially lower pressure, and further whereby the rate of flow of the gas is indicated by the position of said obstruction within said inner flow tube.

2. An integral gas regulator and flowmeter as described in claim 1, further comprising a flow rate valve in communication with said low pressure gas passage for manually adjusting the rate of flow of the low pressure gas from said low pressure gas outlet.

3. An integral gas regulator and flowmeter as described in claim 2 further comprising a pressure gauge in communication with said high pressure gas passage, for indicating the pressure of gas entering said high pressure gas inlet.

4. An integral gas regulator and flowmeter as described in claim 1 further comprising graduations on said inner flow tube for indicating the position of said obstruction within said inner flow tube so as to provide an indicium of the flow rate of the low pressure gas.

5. An integral gas regulator and flowmeter as described in claim 1 wherein said inner flow tube is substantially cylindrical and said outer flow tube is substantially frustroconical, and further wherein said flow tubes are arranged so as to be positioned in a normally vertical position when in use.

6. An integral gas regulator and flowmeter as described in claim 3 wherein said flow rate valve is a screw-type needle valve.

7. An integral regulator and flowmeter as described in claim 1 wherein said receptacle has a first portion having a first cross sectional area, and a second portion having a second cross sectional area, said second area being larger than said first area.

8. An integral gas regulator and flowmeter, comprising:
- a housing body having a high pressure gas inlet, a low pressure gas outlet, and a receptacle, said receptacle having a first portion having a first cross sectional area and a second portion having a second cross sectional area, said second area being larger than said first area;
- a valve seat within said receptacle;
- a high pressure gas passage in said housing body for communicating high pressure gas from said gas inlet to said valve seat and opening into said receptacle;
- a differential pressure piston slidably received within said receptacle and having a first end having a cross sectional area corresponding to said first area of said receptacle and being arranged for cooperation with said valve seat for controlling gas flow into said receptacle, and a second end having a cross sectional area corresponding to said second area of said receptacle;
- a first gas seal on said piston adjacent said first end and a second gas seal on said piston adjacent said second end, each said seal being slidable against said receptacle;
- a bore within said piston for communicating gas from said first end to said second end;
- a pressure delivery spring extending between said housing body and said piston so as to bias said first end of said piston away from said valve seat;
- a floating inner flow tube mounted on a portion of said second end of said piston for receiving gas from said piston bore;
- a gas obstruction within said inner flow tube having a size so as to permit gas to flow through said inner flow tube, around and past said gas obstruction;
- an outer flow tube mounted on said housing body so as to overlie said inner flow tube and to define a gas plenum around said inner flow tube, such that gas may flow out of said inner flow tube and into said gas plenum;
- a low pressure gas passage in said housing body for communicating low pressure gas from said gas plenum to said low pressure gas outlet; and
- an adjustable flow rate valve in communication with said low pressure gas passage, for manually adjusting the rate of flow of the low pressure gas, whereby the pressure of a gas is reduced from a high pressure to a desired substantially lower pressure, and whereby the rate of flow of said gas is reflected by the position of said obstruction within said inner flow tube, and further whereby said flow rate and low pressure may be maintained at desired levels.

9. An integral gas regulator and flowmeter as described in claim 8 further comprising a pressure gauge in communication with said high pressure gas passage, for indicating the pressure of gas entering said gas inlet.

10. An integral gas regulator and flowmeter as described in claim 9 further comprising graduations on said inner flow tube for indicating the position of said obstruction within said inner flow tube so as to provide an indicium of the flow rate of the low pressure gas.

11. An integral gas regulator and flowmeter as described in claim 10 wherein said inner flow tube is substantially cylindrical and said outer flow tube is substantially frustroconical, and further wherein said flow tubes are arranged so as to be positioned in a normally vertical position when in use.

12. An integral gas regulator and flowmeter as described in claim 11 wherein said adjustable flow rate valve is a screw-type needle valve.

13. An integral gas regulator and flowmeter, comprising:
- a housing body having a high pressure gas inlet, a low pressure gas outlet, and a receptacle, said receptacle having a first portion having a first cross sectional area and a second portion having a second cross sectional area, said second area being larger than said first area;
- a valve seat within said receptacle;
- a high pressure gas passage in said housing body for communicating high pressure gas from said gas inlet to said valve seat and opening into said receptacle;
- a differential pressure piston slidably received within said receptacle and having a first end having a cross sectional area corresponding to said first area of said receptacle and being arranged for cooperation with said valve seat for controlling gas flow into said receptacle, and a second end having a cross sectional area corresponding to said second area of said receptacle;
- a first gas seal on said piston adjacent said first end and a second gas seal on said piston adjacent said second end, each said seal being slidable against said receptacle;
- a bore within said piston for communicating gas from said first end to said second end;
- a pressure delivery spring extending between said housing body and said piston so as to bias said first end of said piston away from said valve seat;
- a floating inner flow tube mounted on a portion of said second end of said piston for receiving gas from said piston bore;
- a ball within said inner flow tube having a diameter so as to permit gas to flow through said inner flow tube, around and past said ball;
- an outer flow tube mounted on said housing body so as to overlie said inner flow tube and to define a gas plenum around said inner flow tube, such that gas may flow out of said inner flow tube and into said gas plenum;
- a low pressure gas passage in said housing body for communicating low pressure gas from said gas plenum to said low pressure gas outlet; and
- a pressure gauge in connection with said high pressure gas passage in said housing body for indicating the pressure of gas entering said gas inlet, whereby the pressure of a gas is reduced from a high pressure to a desired substantially lower pressure, and whereby the rate of flow of said gas is reflected by the position of said ball within said inner flow tube.

* * * * *

UNITED STATES PATENT AND TRADEMARK OFFICE
CERTIFICATE OF CORRECTION

PATENT NO. : 5,398,721
DATED : March 21, 1995
INVENTOR(S) : David Alan Pryor

It is certified that error appears in the above-indentified patent and that said Letters Patent is hereby corrected as shown below:

Column 1, line 13, the heading "Background of the Invention" should be -- BACKGROUND OF THE INVENTION--.

Signed and Sealed this

Eleventh Day of July, 1995

BRUCE LEHMAN

*Attest:*

*Attesting Officer*  *Commissioner of Patents and Trademarks*